A. MIKLEA.
PERMUTATION LOCK.
APPLICATION FILED SEPT. 1, 1917.
1,290,631.                                    Patented Jan. 7, 1919.
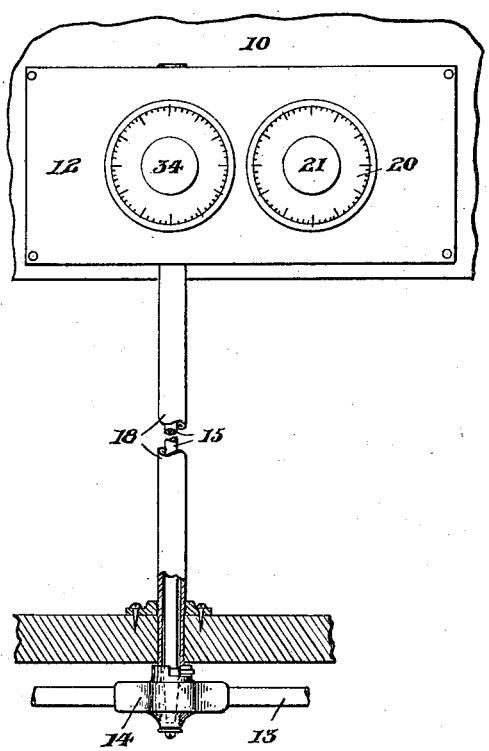
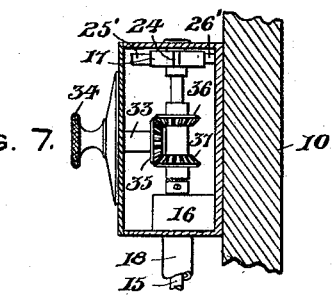
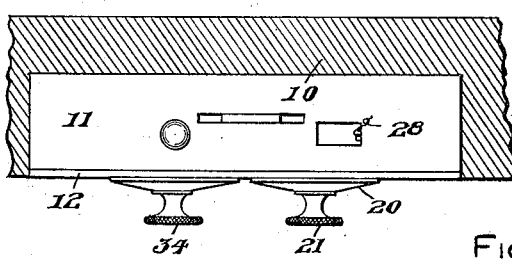
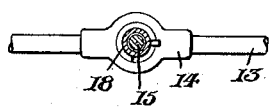

UNITED STATES PATENT OFFICE.

ALEXANDER MIKLEA, OF DETROIT, MICHIGAN.

PERMUTATION-LOCK.

1,290,631.  Specification of Letters Patent.  Patented Jan. 7, 1919.

Application filed September 1, 1917. Serial No. 189,360.

*To all whom it may concern:*

Be it known that I, ALEXANDER MIKLEA, a subject of the King of Hungary, residing at Detroit, in the county of Wayne and State of Michigan, have invented certain new and useful Improvements in Permutation-Locks, of which the following is a specification.

The primary object of the present invention is an improved arrangement of the bolt and tumblers of a permutation lock in which a spring projected bolt is held retracted by a latch controlled by the tumblers.

As shown, my improved lock is incorporated in a panel adapted to be mounted on an automobile to control the fuel supply and ignition circuit of the engine.

In the drawings forming a part of this application, and in which like designating characters refer to corresponding parts throughout the several views:

Figure 1 is an elevational view of a portion of an instrument board of an automobile provided with the present device, the connections with the gasolene valve being illustrated with parts broken away.

Fig. 2 is a top plan view thereof.

Fig. 3 is a transverse sectional view taken adjacent the valve.

Fig. 4 is a view of the device with the front plate removed showing the device in its locked position.

Fig. 5 is a view thereof with the cover-plate in position and with the lock released, the electrical circuit being closed and the gasolene valve open.

Fig. 6 is a longitudinal sectional view thereof, and

Fig. 7 is a transverse sectional view of the same.

Referring more in detail to the drawing, an instrument board 10 of an automobile is herein partially illustrated with a lock casing 11 of the present device mounted thereon, a cover-plate 12 being provided for said casing. The gasolene feed pipe 13 for supplying fuel to the motor of the automobile is provided with a controlling valve 14 having an operating stem 15 which extends transversely through and is journaled in a bearing 16 of the casing 11, said stem 15 having a cylindrical collar 17 secured thereon within the casing. A protecting tube 18 surrounds the stem 15 between the casing 11 and the valve 14 and is adapted to prevent the stem 15 from being tampered with to disconnect the same from the locking mechanism for the purpose of surreptitiously turning the valve stem to open the gasolene valve 14, it being understood that if both the tube 18 and stem 15 were severed, it would then be practically impossible to readily turn the stem within the tube.

A permutation lock 19 which is arranged within the casing 11 has the usual form of dial 20 and turn knob 21, for operating the lock, arranged exteriorly of the cover-plate 12. A flat sliding bolt 22 is arranged within the casing 11 to be operated by the knob 21 in the usual manner and has a reduced end 23 adapted to enter a peripheral slot 24 in the collar 17 when the valve 14 is in its closed position, at which time the stop lug 25 carried by the collar 17 engages a post 26 within the casing. When valve 14 is in its open position, stop lug 25' carried by collar 17 engages post 26' within the casing 11. The circuit wires of the motor ignition system are provided with a switch 27 within the casing 11 for controlling the current to the motor, one terminal 28 of the circuit wires being electrically connected to a plug 29 carried by the bolt 22, while the other terminal 30 of the wire is attached to a socket form of contact 31 adapted to receive the plug 29 when the bolt 22 is retracted. The socket 31 has its sides slotted to form resilient portions 32 and it will be understood that, when the bolt end 23 is withdrawn from the keeper slot 24 of the collar 17 to permit turning of the valve stem 15, the switch plug 29 will be actuated to close the electrical circuit of the motor ignition mechanism.

A stub shaft 33 is journaled through the cover-plate 12 and is provided with a turn-knob 34 upon its outer end, while a pinion 35 is secured upon its inner end and is in constant mesh with a similar pinion 36 secured on the valve stem 15. An idler pinion 37 is freely journaled upon the stem 15 opposite the pinion 36 and it will be understood that, when the bolt 22 is retracted as shown in Fig. 5 of the drawing, the knob 34 may be readily turned for opening or closing the valve 14 as may be found desirable.

The bolt 22 is provided with a pivoted detent 38 having an angular end 39 normally riding upon the peripheries of the rotary tumbler disks 40 and 41 forming a part of the lock 19. A spring 42 normally resiliently maintains the end 39 in contact with said disks while a spring 47 is provided to project the bolt 22 when released in the manner hereinafter described. The disks 40 and 41 are provided with notches 43 and 44 respectively and when the lock 19 is unlocked, the end 39 of the lever 38 is within the notches 43 and 44. A square shaft 45 carries the disks 40 and 41 and the knob 21, and a turning of the disk 41, when the lever end 39 is arranged within the notches 43 and 44, brings the shoulder or side 46 of the notch 44 against the end 39 so that a further turning of the disk 41 in the direction indicated by the arrow in Fig. 4 effects a retraction of the bolt 22 against the action of the spring 47, thus releasing the valve stem collar 17 and closing the switch 27. A slidable latch 48 is vertically arranged in the casing 11 and has an elevating spring 49 to shift the same whereby a side shoulder 50 at the top of the latch is maintained against the bottom 51 of the bolt 22 when the latter is projected and in front of the bolt 22 when the latter is retracted as illustrated in Fig. 5 of the drawing. A heel 52, provided on lever 38, is at all times positioned adjacent the upper end 53 of the latch 48 and when the disk 41 is turned in a direction reversed to that indicated by the arrow in Fig. 4, the lever 38 will be moved upon its pivot by the riding of the end 39 outwardly of the notch 44 to the periphery of the disk 41, which action will depress the latch 48 to thereby release the latter from the bolt 22 and thus permit the spring 47 to project the bolt.

The complete operation of the device will be apparent from this detailed description thereof it being seen that the gasolene valve controlling knob 34 and the combination lock-operating knob 21 are positioned for convenient access upon the instrument board of the vehicle. When the automobile is not in use, the knob 21 is turned for locking the permutation members 40 and 41, positioning the bolt 22 in its projected arrangement with the ignition switch 27 open and the valve stem 15 locked against turning. A person familiar with the combination of the lock may thereafter release the permutation members by turning the knob 21 and this, effecting the retraction of the bolt 22, closes the ignition switch 27 and releases the valve stem collar 17 so that the knob 34 may be turned for opening the gasolene valve 14. A serviceable device for the complete control of the electric current and fuel for the motor of a vehicle is thus provided, the structure being difficult to operate by an unauthorized person.

What I claim as new is:—

A device of the class described comprising a casing, a locking bolt shiftably arranged therein, a spring-pressed latch arranged within the path of said bolt when the latter is retracted, a spring to project the bolt when the latch is released, permutation disks arranged adjacent said bolt having peripheral notches, an operating lever pivoted upon the bolt having a heel overlying said latch and having an opposite angular end normally engaging the peripheries of said disks when the bolt is projected and arranged within said notches when the bolt is retracted, and operating means for said disks.

In testimony whereof I affix my signature.

ALEXANDER MIKLEA.

Copies of this patent may be obtained for five cents each, by addressing the "Commissioner of Patents, Washington, D. C."